US011891015B2

(12) United States Patent
Lerch et al.

(10) Patent No.: US 11,891,015 B2
(45) Date of Patent: Feb. 6, 2024

(54) GROUP SHARING OF A SECURE DIGITAL CAR KEY

(71) Applicant: Apple Inc., Cupertino, CA (US)

(72) Inventors: Matthias Lerch, San Francisco, CA (US); Alexander D Pelletier, Sunnyvale, CA (US); Florian Galdo, Emerald Hills, CA (US); Gordon Y Scott, Cupertino, CA (US); Oren M Elrad, Los Gatos, CA (US); Yogesh D Karandikar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 17/716,817

(22) Filed: Apr. 8, 2022

(65) Prior Publication Data

US 2023/0322185 A1    Oct. 12, 2023

(51) Int. Cl.
*B60R 25/24*      (2013.01)
*G07C 9/00*       (2020.01)
*H04W 4/40*       (2018.01)
*H04L 9/08*       (2006.01)

(52) U.S. Cl.
CPC ........ *B60R 25/245* (2013.01); *G07C 9/00309* (2013.01); *G07C 9/00896* (2013.01); *H04L 9/08* (2013.01); *H04W 4/40* (2018.02); *B60R 2325/108* (2013.01); *H04L 2209/84* (2013.01)

(58) Field of Classification Search
None
See application file for complete search history.

(56) References Cited

U.S. PATENT DOCUMENTS

| 11,330,429 | B2 | 5/2022 | Kim |
| 2018/0326947 | A1 | 11/2018 | Oesterling |
| 2019/0215163 | A1 | 7/2019 | Suleiman |

FOREIGN PATENT DOCUMENTS

DE    102020124235 A1 *  4/2021  ............. B60R 25/24

* cited by examiner

*Primary Examiner* — K. Wong
(74) *Attorney, Agent, or Firm* — Kowert, Hood, Munyon, Rankin & Goetzel, P.C.

(57) ABSTRACT

During operation, an electronic device may provide, to a second electronic device, an invitation to share a digital car key associated with a user of the electronic device and a vehicle, where the invitation includes information for creating another instance of the digital car key on the second electronic device. Then, the electronic device may receive, from the second electronic device, a message accepting the invitation, where the message includes a certificate associated with the other instance of the digital car key on the second electronic device. Moreover, the electronic device may provide, to the second electronic device, an approved version of the certificate with a digital signature of the user. Next, the electronic device may provide, to the computer, an instruction to share the digital car key with a set of electronic devices, which is associated with a second user of the second electronic device.

20 Claims, 6 Drawing Sheets

GROUP SHARING OF A SECURE DIGITAL CAR KEY

FIELD

The described embodiments relate, generally, to wireless communications among electronic devices, including techniques for sharing a secure digital car key with a set of electronic devices associated with an individual.

BACKGROUND

There is increased interest from vehicle manufacturers in electronic features and services. For example, in recent years some vehicle manufacturers have implemented or supported the use of secure digital car keys, such as digital car keys that are compatible with protocols defined by the Car Connectivity Consortium® or CCC (of Beaverton, Oregon). Notably, after a user (such as an owner of a vehicle) performs a car-key-pairing procedure between an electronic device (such as the user's cellular telephone) and the vehicle, the user may use the electronic device as a digital car key for the vehicle via wireless communication. This capability may allow the electronic device to supplement or to replace the use of a separate key fob.

However, the availability of digital car keys poses additional challenges. For example, it is difficult for the user to share or transfer a digital car key to other individuals. Notably, in existing share procedures, only the owner of a vehicle may directly share their digital car key. Thus, if the owner shares a digital car key with a family member, the family member may not be able to securely share the digital car key with another individual, such as a friend, a valet, a towing service or a mechanic. Instead, if the family member wants to share the digital car key with the other individual, they typically need to ask the owner to share the digital car key with the other individual. This approach is cumbersome and inconvenient, which is frustrating to users and decreases the likelihood that users will take advantage of digital car keys and associated services.

SUMMARY

An electronic device that securely shares a digital car key with a set of electronic devices is described. This electronic device includes: an antenna node that can communicatively couple to an antenna; an interface circuit that communicates with a second electronic device and a computer; a processor; and memory storing program instructions. During operation, the electronic device provides, addressed to the second electronic device, an invitation to share the digital car key associated with a user of the electronic device and a vehicle, where the invitation includes information for creating another instance of the digital car key on the second electronic device. Then, the electronic device receives, associated with the second electronic device, a message accepting the invitation, where the message includes a certificate associated with the other instance of the digital car key on the second electronic device. Moreover, the electronic device provides, addressed to the second electronic device, an approved version of the certificate with a digital signature of the user. Next, the electronic device provides, addressed to the computer, an instruction to share the digital car key with the set of electronic devices, where the set of electronic devices is associated with an account of a second user of the second electronic device.

Note that electronic devices in the set of electronic devices may be associated with multiple individuals.

Moreover, the instruction to share the digital car key may include approved versions of certificates for use with the set of electronic devices. Alternatively, the electronic device may receive, associated with a given electronic device in the set of electronic devices, a given message with a given certificate associated with an additional instance of the digital car key on the given electronic device. Then, the electronic device may provide, addressed to the given electronic device, an approved version of the given certificate with the digital signature of the user.

Furthermore, the instruction to share the digital car key may include second information for creating additional instances of the digital car key on the set of electronic devices.

Additionally, the other instance of the digital car key or a given additional instance of the digital car key installed on a given electronic device in the set of electronic devices may have different privileges or rights than the digital car key. Moreover, the privileges or rights associated with the other instance of the digital car key or the given additional instance of the digital car key may include being allowed to share the digital car key with another electronic device. Furthermore, the privileges or rights associated with the other instance of the digital car key or the given additional instance of the digital car key may include: an ability to control a subset of features associated with the vehicle; one or more circumstances when the other digital car key and/or the given additional instance of the digital car key is valid (such as a time interval during which the other or the additional instance of the digital car key is valid); and/or an operating constraint on at least a feature associated with the vehicle.

In some embodiments, the user may include an owner of the vehicle.

Moreover, the electronic device may provide, addressed to a second computer associated with a manufacturer or provider of the vehicle, a report specifying a number of instances of the digital car key that have been created. Furthermore, the instructions may be based at least in part on a predefined maximum number of instances of the digital car key.

Furthermore, the information or the instructions may include: an identifier of the vehicle, an encryption key associated with the user, and/or privileges or rights associated with the other instance of the digital car key or a given additional instance of the digital car key installed on a given electronic device in the set of electronic devices.

Additionally, in some embodiments, the electronic device may modify an access right to the vehicle and/or a sharing entitlement of the second electronic device (which may define an ability of the second electronic device to share one or more additional instances of the digital car key with one or more additional electronic devices, such as a number of additional instances of the digital car key than can be shared).

Other embodiments provide the second electronic device that performs counterpart operations to at least some of the operations performed by the electronic device.

Other embodiments provide the computer that performs counterpart operations to at least some of the operations performed by the electronic device. For example, the computer may limit a length of the sharing of the instances of the digital car key, such as by defining the maximum number of instances of the digital car key.

Other embodiments provide an integrated circuit for use with the electronic device or the second electronic device. The integrated circuit may perform at least some of the aforementioned operations.

Other embodiments provide a computer-readable storage medium for use with the electronic device, the second electronic device or the computer. When program instructions stored in the computer-readable storage medium are executed by the electronic device, the second electronic device or the computer, the program instructions may cause the electronic device, the second electronic device or the computer to perform at least some of the aforementioned operations of the electronic device, the second electronic device or the computer.

Other embodiments provide a method. The method includes at least some of the aforementioned operations performed by the electronic device, the second electronic device or the computer.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
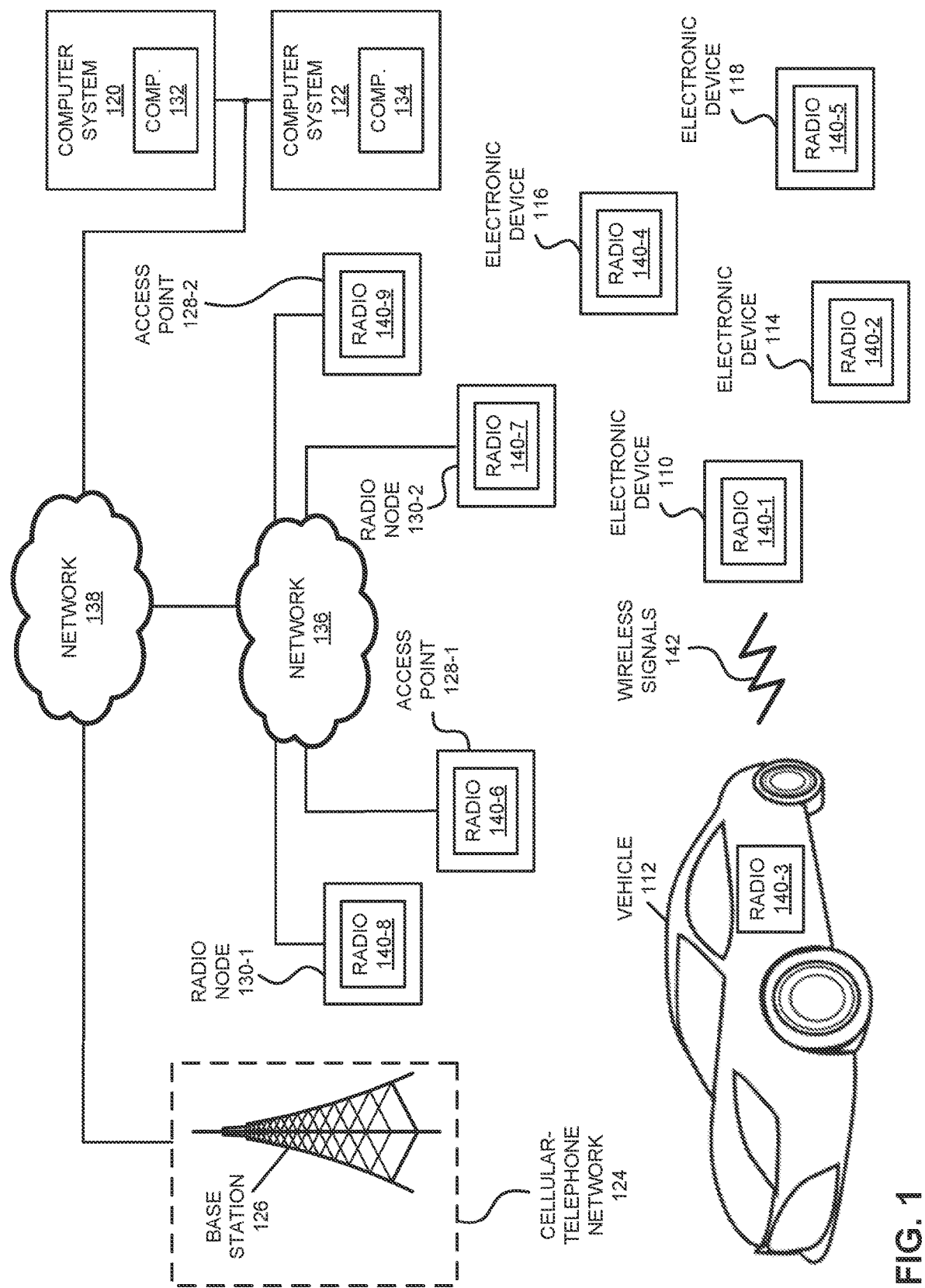
FIG. 1 illustrates an example of communication between electronic devices according to some embodiments of the disclosure.

Some embodiments include an electronic device that shares a digital car key with a set of electronic devices. During operation, the electronic device may provide, to a second electronic device, an invitation to share the digital car key associated with a user of the electronic device and a vehicle, where the invitation includes information for creating another instance of the digital car key on the second electronic device. Then, the electronic device may receive, from the second electronic device, a message accepting the invitation, where the message includes a certificate associated with the other instance of the digital car key on the second electronic device. Moreover, the electronic device may provide, to the second electronic device, an approved version of the certificate with a digital signature of the user. Next, the electronic device may provide, to the computer, an instruction to share the digital car key with the set of electronic devices, where the set of electronic devices is associated with an account of a second user of the second electronic device.

By sharing the digital car key with the second electronic device and the set of electronic devices, these communication techniques may allow the digital car key to be used by multiple individuals. Notably, the communication techniques may provide a flexible and convenient approach for the user to share the digital car key with the second user of the second electronic device and one or more individuals associated with the set of electronic devices. Consequently, the communication techniques may improve the user experience, which may encourage potential users to take advantage of or to use the digital car key and associated services.

In the discussion that follows, a user may include: an individual, an organization, a company, a governmental agency, a for-profit business entity, a not-for-profit entity, or a group of one or more individuals.

Note that the communication techniques may be used during or with wired or wireless communication between electronic devices in accordance with a communication protocol, such as a communication protocol that is compatible with an IEEE 802.11 standard (which is sometimes referred to as Wi-Fi). However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, California) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11ba, IEEE 802.11be, or other present or future developed IEEE 802.11 technologies.

Note that the electronic device may use multi-user transmission (such as OFDMA) and/or multiple-input multiple-output (MIMO).

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). Note that the access point may be a physical access point or a virtual or 'software' access point that is implemented on a computer or an electronic device. However, in other embodiments the electronic device may not be an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable. More generally, the electronic devices described herein may be capable of communicating with other present or future developed cellular-telephone technologies.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices that communicate using wired and/or wireless communication. Notably, a car-key pairing may have been established between an electronic device 110 (such as a smartphone, a laptop computer, a notebook computer, a tablet, or another such electronic device) and vehicle 112 (such as a car, a truck, a bus, a bicycle, a moped, a motorcycle, etc.). Based at least in part on the car-key pairing, electronic device 110 may function as a digital car key for vehicle 112 by communicating wirelessly using a Bluetooth or a Bluetooth Low Energy communication protocol or a near-field communication protocol. Note that in the present discussion a 'digital car key' may have similar capabilities as a key fob (e.g., a remote-control device that controls a remote keyless entry system and/or that enables a remote vehicle ignition system). However, unlike a key fob, electronic device 110 may not be dedicated solely to the digital car key functionality (e.g., electronic device 110 may also be used for one or more different functions than those associated with a digital car key). In some embodiments, the digital car key may be compatible with a standard or a specification from the Car Connectivity Consortium.

Moreover, electronic device 110 may communicate with one or more electronic devices (such as one or more of electronic devices 114, 116 and/or 118) and/or one or more computer systems (such as computer system 120 and/or computer system 122) using wired and/or wireless communication. Notably, the communication may occur: directly (such as when electronic device 110 is within wireless range of another electronic device, such as electronic device 114), or via a cellular-telephone network 124 (which may include a base station 126), one or more access points 128 (which may communicate using Wi-Fi) in a WLAN and/or one or more radio nodes 130 (which may communicate using LTE or a 5G cellular-telephone communication protocol) in a small-scale network (such as a small cell). For example, the one or more radio nodes 130 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. Note that one or more base stations (such as base station 126), access points 128, and/or radio nodes 130 may be included in one or more wireless networks, such as: a WLAN, a small cell, and/or a cellular-telephone network.

Access points 128 and/or radio nodes 130 may communicate with each other, computer system 120 (which may be a local or a cloud-based computer system that includes one or more computers 132) and/or computer system 122 (which may be another local or another cloud-based computer system that includes one or more computers 134) using a wired communication protocol (such as Ethernet) via network 136 and/or 138. However, in some embodiments, access points 128 and/or radio nodes 130 may communicate with each other using wireless communication (such as Wi-Fi, Bluetooth and/or another wireless communication protocols), e.g., one of access points 128 may be a mesh access point in a mesh network. Note that networks 136 and 138 may be the same or different networks. For example, networks 136 and/or 138 may an LAN, an intra-net or the Internet.

Figure 6:
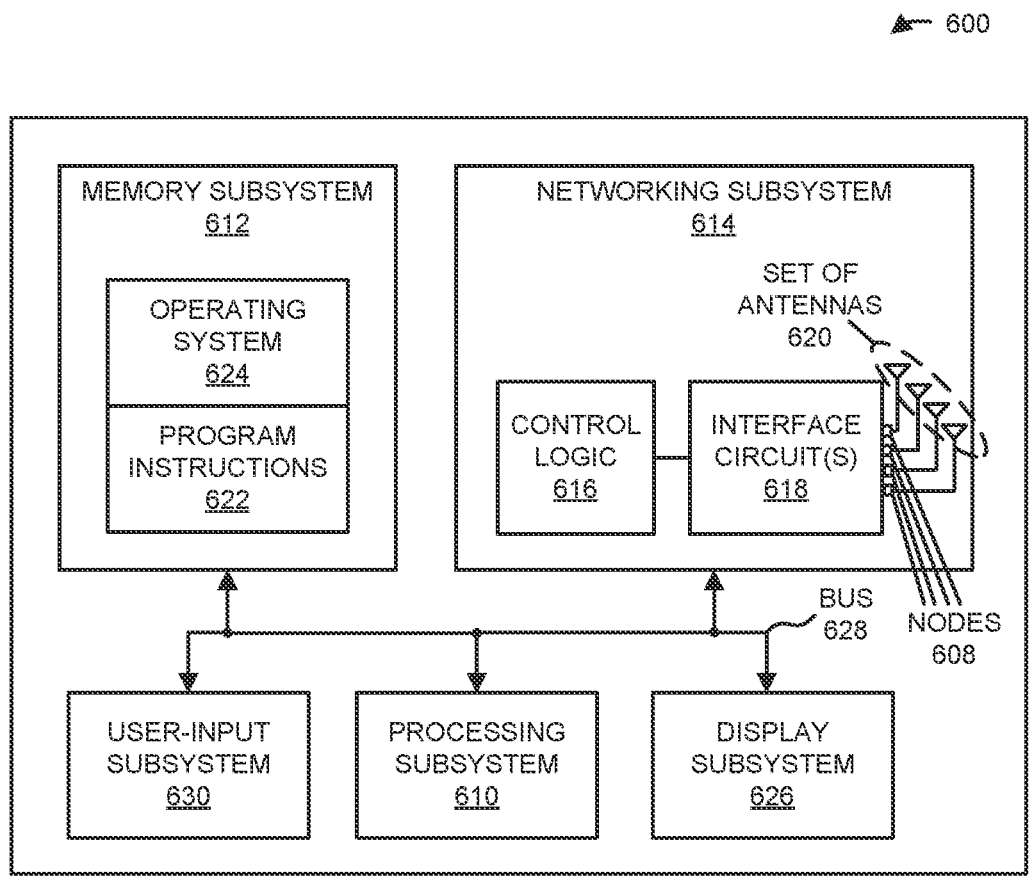
FIG. 6 illustrates an example of an electronic device of FIG. 1 according to some embodiments of the disclosure.

As described further below with reference to FIG. 6, electronic device 110, vehicle 112, electronic device 114, electronic device 116, electronic device 118, computer system 120 and computer system 122 may include subsystems, such as a networking subsystem, a memory subsystem, and a processor subsystem. In addition, electronic device 110, vehicle 112 and electronic device 114, electronic device 116, electronic device 118, access points 128 and radio nodes 130 may include radios 140 in the networking subsystems. More generally, electronic device 110, vehicle 112 and electronic device 114, electronic device 116, electronic device 118, access points 128 and radio nodes 130 can include (or can be included within) any electronic devices with networking subsystems that enable electronic device 110, vehicle 112 and electronic device 114, electronic device 116, electronic device 118, access points 128 and radio nodes 130, respectively, to wirelessly communicate with another electronic device. This can include transmitting frames or beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 142 (represented by a jagged line) are communicated by one or more radios 140-1 and 140-2 in electronic device 110 and electronic device 114, respectively. For example, electronic device 110 and electronic device 114 may exchange packets or frames using a Bluetooth or a Bluetooth Low Energy communication protocol. Moreover, as illustrated further below with reference to FIGS. 2-5, one or more radios 140-1 may receive wireless signals 142 that are transmitted by one or more radios 140-2 via one or more connections between electronic device 110 and electronic device 114. Alternatively, the one or more radios 140-1 may transmit wireless signals 142 that are received by the one or more radios 140-2. The wireless signals 142 may convey one or more packets or frames.

During the communication in FIG. 1, electronic device 110, vehicle 112 and electronic device 114, electronic device 116, electronic device 118, access points 128 and radio nodes 130 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include additional information, such as data, as payloads).

As discussed previously, it can be difficult to share a digital car key with multiple individuals. In order to address these challenges, as described below with reference to FIGS. 2-5, in some embodiments of the disclosed communication techniques electronic device 110 may share the digital car key installed on electronic device 110 with a set of electronic devices. Notably, electronic device 110 may provide, to electronic device 114, an invitation to share the digital car key associated with a user of electronic device 110 (such as an owner of vehicle 112) and vehicle 112, where the invitation includes information for creating another instance of the digital car key on electronic device 114.

After receiving the invitation, a second user of electronic device 114 may accept the invitation. For example, the second user may click on or activate a virtual icon in a user interface that includes the invitation. In response, electronic device 114 may, at least in part, use the information included in the information to create the other instance of the digital car key, e.g., in a secure element (such as a secure enclave processor and associated secure memory) in electronic device 114. Note that, when creating or generating the other instance of the digital car key on electronic device 114, electronic device 114 may create a certificate associated with the other instance of the digital car key (such as a public key certificate, e.g., a certificate that is compatible with an X.509 standard from the International Telecommunication Union of Geneva, Switzerland). In some embodiments, the information in the invitation may include: an identifier of vehicle 112, an encryption key associated with the user (such as an asymmetric encryption key), and/or privileges or rights associated with the other instance of the digital car key to be installed or created on electronic device 114.

Then, electronic device 114 may provide, to electronic device 110, a message accepting the invitation, where the message includes the certificate. After receiving the certificate from electronic device 114, electronic device 110 may provide, to electronic device 114, an approved version of the certificate with a digital signature of the user. Moreover, after receiving the approved version of the certificate with the digital signature of the user, electronic device 114 may store the approved version of the certificate with the digital signature of the user in secure memory in electronic device 114.

Next, electronic device 110 may provide, to one of computers 132 in computer system 120, an instruction to share the digital car key with the set of electronic devices (such as electronic devices 116 and 118), where electronic devices 116 and 118 are associated with an account of a second user of electronic device 114 (such as an account associated with a storage or backup service, which may be provided by a manufacturer or a provider of electronic device 114). Note that the instruction to share the digital car key may include second information for creating additional instances of the digital car key on electronic devices 116 and 118. Moreover, the instruction may directly or indirectly specify the account and/or electronic devices 116 and 118. For example, instruction may include account information for the account, and electronic devices 116 and 118 and/or information such as network addresses of electronic devices 116 and 118 may be specified by or included in stored information for the account in computer system 120. In some embodiments, a maximum number of electronic devices that can have instances of the digital car key (such as electronic devices 114, 116 and 118) may be specified by a computer in computers 134 in computer system 122, which may be associated with a manufacturer or provider of vehicle 112. Thus, the instruction provided by electronic device 110 to one of computers 132 may be based at least in part on a predefined maximum number of instances of the digital car key.

Furthermore, after receiving the instruction from electronic device 110, the computer in computer system 120 may access address information for electronic devices 116 and 118 associated with the account. For example, the computer may access network addresses of electronic devices 116 and 118 or email addresses of one or more individuals associated electronic devices 116 and 118 (which may be stored in memory) based at least in part on the account information for the account. Next, the computer in computer system 120 may provide, to electronic devices 116 and 118, instructions for creating the instances of the digital car key on electronic devices 116 and 118 or invitations for creating the instances of the digital car key on electronic devices 116 and 118.

Note that the instructions may include address information (such as a network address or an email address) of electronic device 110. In some embodiments, the address information of electronic device 110 is included with the instruction received from electronic device 110. Alternatively, the instruction may include a vehicle identifier of the vehicle, and the computer in computer system 120 may access (e.g., in memory) the address information of electronic device 110 based at least in part on the vehicle identifier (such as by performing a look-up operation).

Notably, when a given instance of the digital car key is installed or created on a given electronic device in electronic devices 116 and 118 (such as electronic device 116), electronic device 116 may provide, to electronic device 110, a given message with a given certificate associated with the given instance of the digital car key on electronic device 116. Moreover, after receiving the given certificate from electronic device 116, electronic device 110 may provide, to electronic device 116, an approved version of the given certificate with the digital signature of the user. Furthermore, after receiving the approved version of the given certificate with the digital signature of the user from electronic device 110, electronic device 116 may store the approved version of the given certificate with the digital signature of the user in secure memory in electronic device 116.

Alternatively, instead of directly or indirectly specifying the address information of electronic device 110 in the instructions, the computer in computer system 120 may function as an intermediary between electronic device 110 and electronic devices 116 and 118. For example, the computer in computer system 120 may act as an intermediary between a given electronic device in electronic devices 116 and 118 (such as electronic device 116) and electronic device 110. Notably, when a given instance of the digital car key is installed or created on electronic device 116, electronic device 116 may provide, to the computer in computer system 120, a given message with a given certificate associated with the given instance of the digital car key on electronic device 116. After receiving the given message from electronic device 116, the computer in computer system 120 may provide, to electronic device 110, the given message. Moreover, after receiving the given certificate from the computer in computer system 120, electronic device 110 may provide, to the computer in computer system 120, an approved version of the given certificate with the digital signature of the user. Furthermore, after receiving the approved version of the given certificate with the digital signature of the user from electronic device 110, the computer in computer system 120 may provide, to electronic device 116, the approved version of the given certificate with the digital signature of the user. Next, after receiving the approved version of the given certificate with the digital signature of the user from the computer in computer system 120, electronic device 116 may store the approved version of the given certificate with the digital signature of the user in secure memory in electronic device 116.

In some embodiments, electronic device 110 may provide, to one of computers 134 in computer system 122 associated with a manufacturer or provider of vehicle 112, a report specifying a number of instances of the digital car key that have been created (e.g., on electronic devices 110, 114, 116 and/or 118). This report may allow computer system 122 to track the number of instances of the digital car key that have been created, to modify the predefined maximum number of instances of the digital car key and/or to inform electronic device 110 and/or computer system 120 of a number of remaining instances of the digital car key that can be created.

In summary, the communication techniques may facilitate secure, flexible and convenient sharing of the digital car key for vehicle 112 with one or more electronic devices, such as electronic devices associated with: a family member, a friend, a towing service, a valet, a mechanic, etc. Moreover, the digital car key may be shared by an individual that is other than the owner of vehicle 112. Consequently, the communication techniques may improve the user experience, which may encourage potential users to take advantage of or to use the digital car key and associated services.

In the described embodiments, processing a packet or a frame in electronic device 110, vehicle 112 and electronic device 114, electronic device 116, electronic device 118, access points 128 and/or radio nodes 130 may include: receiving the wireless signals 142 with the packet or the frame; decoding/extracting the packet or the frame from the received wireless signals 142 to acquire the packet or the frame; and processing the packet or the frame to determine the information contained in the payload of the packet or the frame (such as data in the payload).

In general, the communication via the one or more connections in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple connections or links may be used during communication between an electronic device (such as electronic device 110, electronic device 114, electronic device 116 or electronic device 118) and vehicle 112. Moreover, while electronic device 110 performed operations in the communication techniques, in other embodiments at least some of these operations may be performed by vehicle 112 and/or computer system 120. Consequently, electronic device 110, vehicle 112 and/or computer system 120 may perform operations in the communication techniques.

Figure 2:
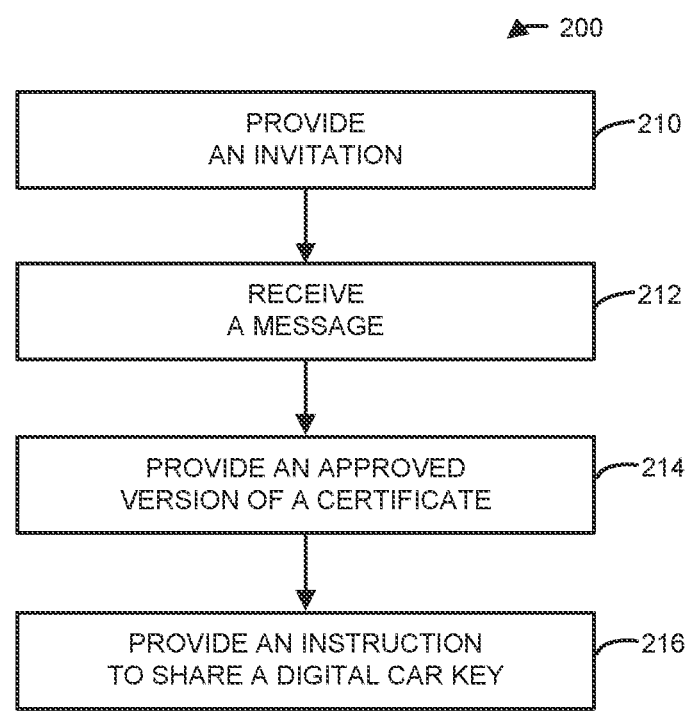
FIG. 2 illustrates an example method for sharing a digital car key with a set of electronic devices according to some embodiments of the disclosure.

FIG. 2 presents a flow diagram illustrating an example method 200 for sharing a digital car key with a set of electronic devices. This method may be performed by an electronic device, such as electronic device 110 in FIG. 1.

During operation, the electronic device may provide, addressed to a second electronic device, an invitation (operation 210) to share the digital car key associated with a user of the electronic device and a vehicle, where the invitation includes information for creating another instance of the digital car key on the second electronic device. Note that the user may include an owner of the vehicle.

Then, the electronic device may receive, associated with the second electronic device, a message (operation 212) accepting the invitation, where the message includes a certificate associated with the other instance of the digital car key on the second electronic device. Moreover, the electronic device may provide, addressed to the second electronic device, an approved version of the certificate (operation 214) with a digital signature of the user.

Next, the electronic device may provide, addressed to the computer, an instruction to share the digital car key (operation 216) with the set of electronic devices, where the set of electronic devices is associated with an account of a second user of the second electronic device. The instruction to share the digital car key may include second information for creating additional instances of the digital car key on the set of electronic devices. Note that electronic devices in the set of electronic devices may be associated with one or more individuals.

In some embodiments, the electronic device optionally performs one or more additional operations. For example, the electronic device may receive, associated with a given electronic device in the set of electronic devices, a given message with a given certificate associated with an additional instance of the digital car key on the given electronic device. Then, the electronic device may provide, addressed to the given electronic device, an approved version of the given certificate with the digital signature of the user. Alternatively, the instruction to share the digital car key may include approved versions of certificates for use with the set of electronic devices.

Additionally, the other instance of the digital car key or a given additional instance of the digital car key installed on a given electronic device in the set of electronic devices may have different privileges or rights than the digital car key. Moreover, the privileges or rights associated with the other instance of the digital car key or the given additional instance of the digital car key may include being allowed to share the digital car key with another electronic device. Furthermore, the privileges or rights associated with the other instance of the digital car key or the given additional instance of the digital car key may include: an ability to control a subset of features associated with the vehicle; one or more circumstances when the other digital car key and/or the given additional instance of the digital car key is valid (such as a time interval during which the other or the additional instance of the digital car key is valid, or until another instance of the digital car key is used to access or unlock the vehicle); and/or an operating constraint on at least a feature associated with the vehicle (such as a power or a speed constraint).

In some embodiments, the electronic device may provide, addressed to a second computer associated with a manufacturer or provider of the vehicle, a report specifying a number of instances of the digital car key that have been created. Furthermore, the instructions may be based at least in part on a predefined maximum number of instances of the digital car key.

Additionally, the information or the instructions may include: an identifier of the vehicle, an encryption key associated with the user, and/or privileges or rights associated with the other instance of the digital car key or a given additional instance of the digital car key installed on a given electronic device in the set of electronic devices.

Figure 3:
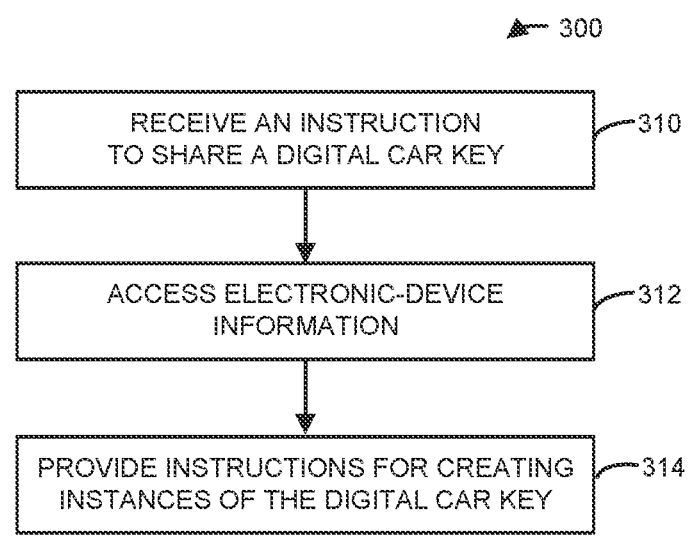
FIG. 3 illustrates an example method for sharing a digital car key with a set of electronic devices according to some embodiments of the disclosure.

FIG. 3 presents a flow diagram illustrating an example method 300 for sharing a digital car key with a set of electronic devices. This method may be performed by a computer, such as one of computers 132 in computer system 120 in FIG. 1.

During operation, the computer may receive, associated with an electronic device, an instruction to share a digital car key (operation 310) with the set of electronic devices, where digital car key is associated with an individual and a vehicle, and where the set of electronic devices is associated with an account of a user of the electronic device. The instruction to share the digital car key may include information for creating instances of the digital car key on the set of electronic devices. Note that the individual may include an owner of the vehicle.

Then, the computer may access electronic-device information (operation 312) of the set of electronic devices associated with the account. For example, the computer may access network addresses of the set of electronic devices or email addresses of one or more individuals associated with the set of electronic devices (which may be stored in memory) based at least in part on account information for the account, which may be included in the instruction.

Next, the computer may provide, addressed to the set of electronic devices, instructions for creating the instances of the digital car key (operation 314) on the set of electronic devices. Note that the instructions may include address information (such as a network address or an email address) of a second electronic device associated with the individual. In some embodiments, the address information of the second electronic device is included with the instruction. Alternatively, the instruction may include a vehicle identifier of the vehicle, and the computer may access (e.g., in memory) the address information of the second electronic device based at least in part on the vehicle identifier (such as by performing a look-up operation).

In some embodiments, the computer optionally performs one or more additional operations. For example, instead of providing the address information of the second electronic device in the instructions, the computer may act as an intermediary between a given electronic device in the set of electronic devices and the second electronic device. Notably, when a given instance of the digital car key is installed or created on a given electronic device in the set of electronic devices, the computer may receive, associated with the given electronic device, a given message with a given certificate associated with the given instance of the digital car key on the given electronic device. Then, the computer may provide, addressed to the second electronic device, the given message. Moreover, the computer may receive, associated with the second electronic device, an approved version of the given certificate with the digital signature of the second user. Next, the computer may provide, addressed to the given electronic device, the approved version of the given certificate with the digital signature of the second user.

In some embodiments of method 200 (FIG. 2) and/or 300, there may be additional or fewer operations. Further, one or more different operations may be included. Moreover, the order of the operations may be changed, and/or two or more operations may be combined into a single operation or performed at least partially in parallel.

Figure 4:
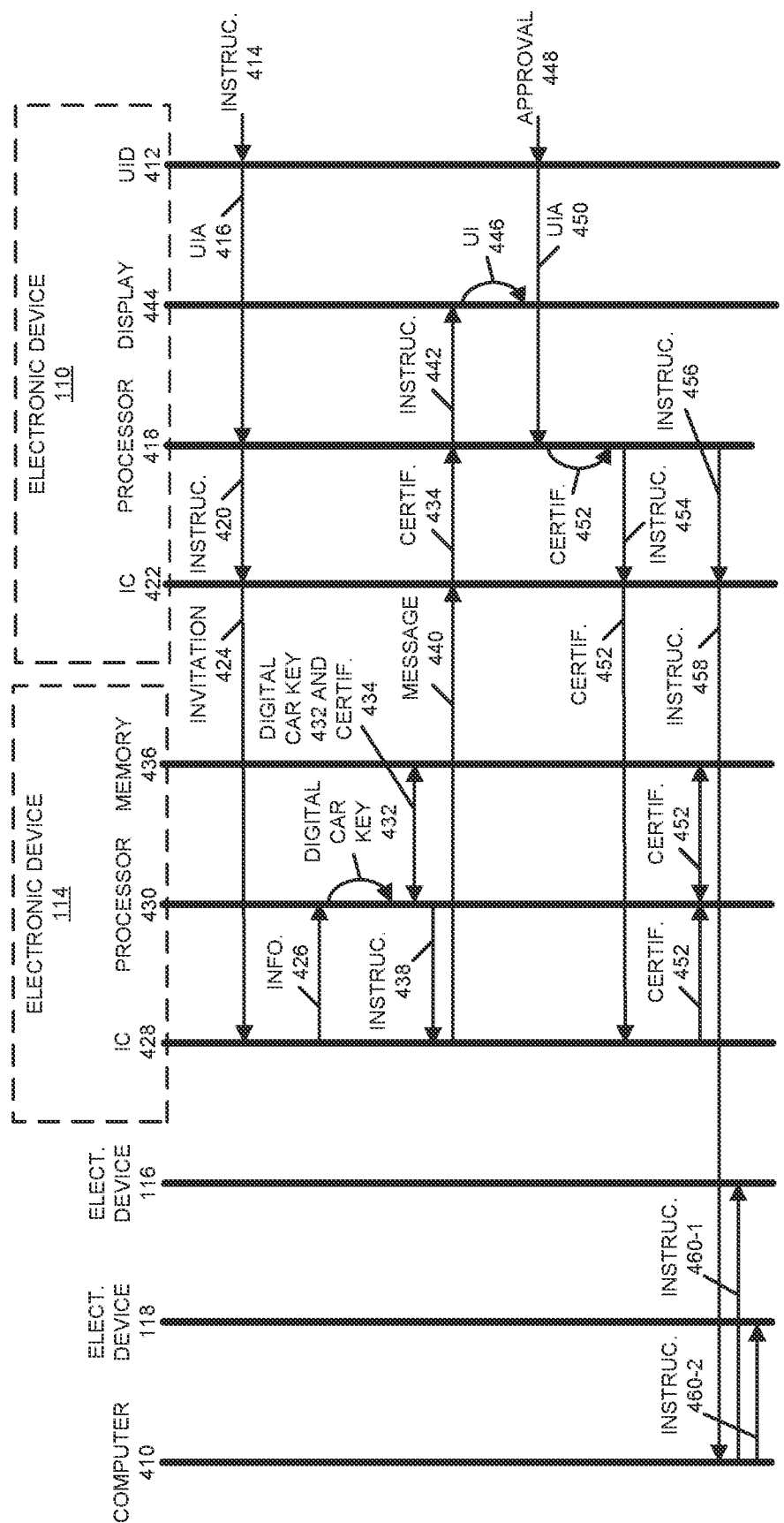
FIG. 4 illustrates an example of communication among components, e.g., in the electronic devices of FIG. 1 according to some embodiments of the disclosure.

The communication techniques are further illustrated in FIG. 4, which presents a flow diagram illustrating an example of communication among components in electronic device 110, electronic device 114, electronic device 116, electronic device 118 and computer 410 (which may be one of computers 132 in FIG. 1). During operation, a user of electronic device 110 may interact with a user-interface device (UID) 412 in electronic device 110 (such as a keyboard, a mouse, a touch-sensitive display, a voice interface, etc.) to provide an instruction 414 to share a digital car key (which is associated with the user and vehicle 112 in FIG. 1) with electronic device 114. In response, user-interface device 412 may provide user-interface activity (UTA) 416 corresponding to instruction 414 to processor 418 in electronic device 110. Then, based on instruction 414, processor 418 may provide an instruction 420 to interface circuit (IC) 422 in electronic device 110 to provide, to electronic device 114, an invitation 424 to share the digital car key, where invitation 424 includes information 426 for creating another instance of the digital car key on electronic device 114.

After receiving invitation 424, an interface circuit 428 in electronic device 114 may provide information 426 to a processor 430 (such as a secure processor) in electronic device 114. Then, based at least in part on information 426, processor 430 may create the other instance of the digital car key (such as digital car key 432), and may store digital car key 432 and an associated certificate 434 in memory 436 (such as secure memory, which may be encrypted and associated with a secure processor) in electronic device 114. Next, processor 430 may instruct 438 interface circuit 428 to provide a message 440 accepting invitation 424, where message 440 includes certificate 434.

Moreover, after receiving message 440, interface circuit 422 may provide certificate 434 to processor 420. In response, processor 420 may instruct 442 a display 444 in electronic device 110 to request approval from the user (e.g., by displaying a user interface or UI 446 with the request). The user may interact with a user-interface device 412 to provide approval 448. Then, user-interface device 412 may provide user-interface activity 450 corresponding to approval 448 to processor 420. Furthermore, based at least in part on approval 448, processor 420 may generate an approved version of the certificate 434 with a digital signature of the user (such as certificate 452). Next, processor 420 may instruct 454 interface circuit 422 to provide certificate 452 to electronic device 114.

Furthermore, after receiving certificate 452, interface circuit 428 may provide certificate 452 to processor 430, which may store certificate 452 in memory 436.

Additionally, after providing certificate 452 to electronic device 114, processor 420 may instruct 456 interface circuit 422 to provide, to computer 410 an instruction 458 to share the digital car key with a set of electronic devices (such as electronic devices 116 and 118), where electronic devices 116 and 118 are associated with an account of a second user of electronic device 114. In response, computer 410 may provide instructions 460 to electronic devices 116 and 118 for creating the instances of the digital car key on electronic devices 116 and 118.

While communication between the components in FIG. 4 is illustrated with unilateral or bilateral communication (e.g., lines having a single arrow or dual arrows), in general a given communication operation may be unilateral or bilateral.

We now further discuss the communication techniques. Typically, existing digital car keys can only be shared directly from an owner of a vehicle to a friend or a family member. Consequently, a receiver of a shared digital car key cannot share the digital car key again (e.g. to a valet). Moreover, existing digital car keys usually can only be shared directly from one electronic device to another. However, this is often frustrating for the sharer, who may want to 'provide access to a vehicle' to a receiver by sharing the digital car key to all the electronic devices of the receiver. Furthermore, the sharer may want to be able to control the life cycle of the shared access by monitoring and controlling the instances of the digital car keys on multiple receiver electronic devices on a per-person as opposed to a per-device level. The disclosed communication techniques allow a chain of shared instances of a digital car key to be created, monitored and controlled. Additionally, a manufacturer or provider of a vehicle may be able to control the number of instances of the digital car key (and, thus, the length of the chain) based at least in part on their security and/or business needs. In some embodiments of the communication techniques, note that an electronic device that is not associated with an account of a second user or that is provided by a different manufacturer that the second electronic device of the second user may only be managed on a per-device basis.

Figure 5:
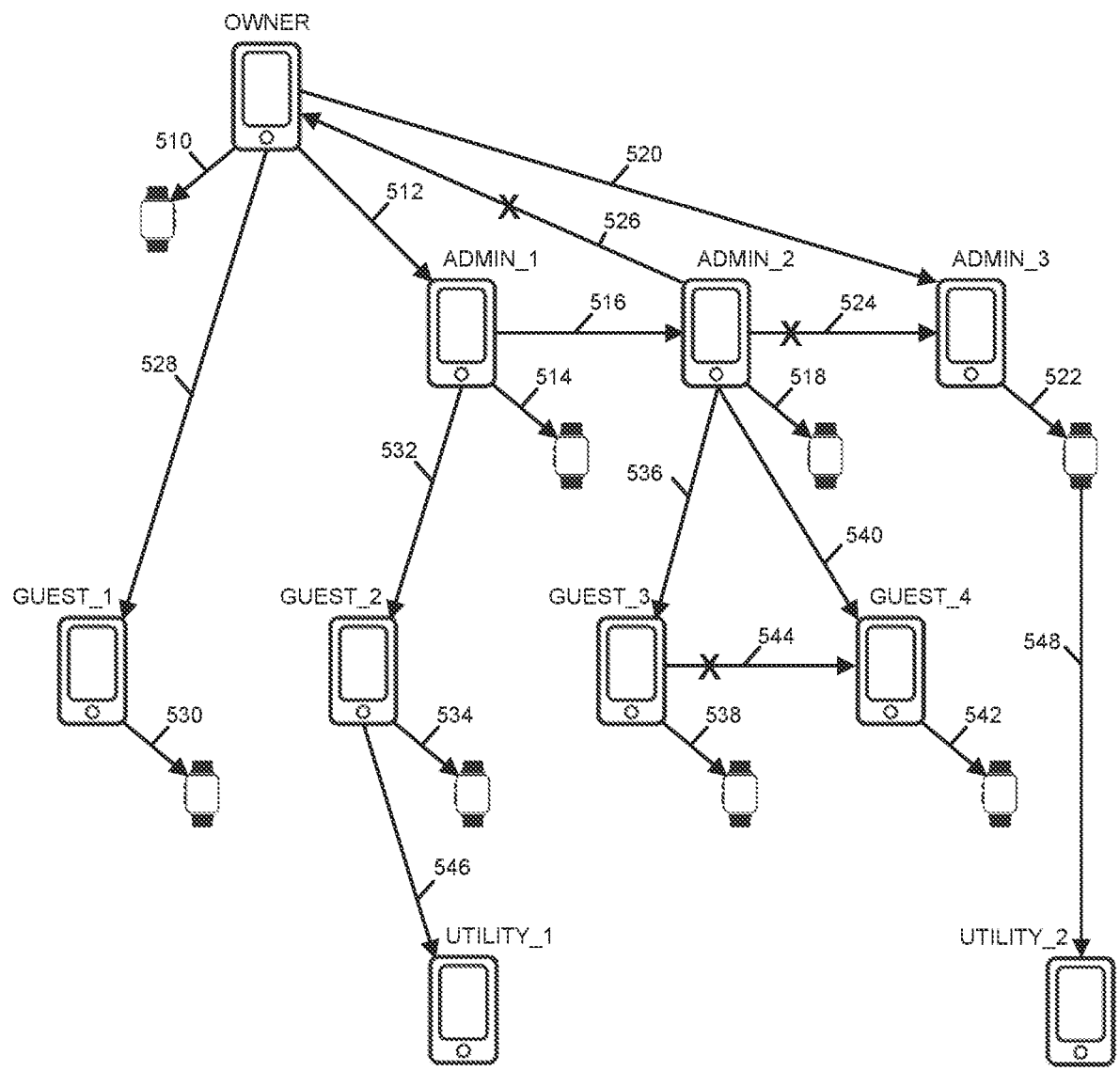
FIG. 5 illustrates an example of a hierarchical arrangement of instances of a digital car key on electronic devices according to some embodiments of the disclosure.

FIG. 5 presents an example of a hierarchical arrangement of instances of a digital car key on electronic devices. Notably, after car-key pairing of a cellular telephone of an owner, the owner may share 510 the digital car key with full access (such as the ability to unlock a vehicle) and drive entitlements or privileges to an electronic watch (which is sometimes referred to as a 'smartwatch') of the owner and/or other electronic devices associated with a same account of the owner (thus, the shareability state of all of the instances of the digital car keys may be 'propagate'). Note that the account of the owner may include nested sub-accounts that are arranged in a hierarchy. For example, the owner and/or the spouse may share a family account which includes sub-accounts for their children. In this example, the family account may be referred to as being 'upstream' of a given sub-account of one of their children. Note that the accounts may or may not be related. Thus, in principle, any account may be upstream of one or more other accounts. This may be determined by a sharing direction. In particular, an electronic device on or associated with an upstream account may share to one or more other electronic devices, whose associated account(s) become downstream account(s) in this example. While sharing may only be from electronic device-to-electronic device, note that the electronic devices on the same account may receive a car key via sharing and may have the same shareability privileges.

Moreover, the owner may share 512 a digital car key with administrator entitlements or privileges (ADMIN_1) to the cellular telephone of their spouse (thus, the shareability state of the ADMIN_1 digital car key may be 'propagate' and it may have full access and drive entitlements or privileges). In turn, the spouse may share 514 the digital car key from their cellular telephone to their electronic watch. Note that sharing 514 may occur automatically or without an explicit action of a user, such as the spouse.

Furthermore, the spouse may share 516 the digital car key from their cellular telephone to the cellular telephone of their son with full access and drive entitlements or privileges (ADMIN_2). Then, the son may share 518 the digital car key from his cellular telephone to his electronic watch and other electronic devices on a same account of the son.

Additionally, the owner may share 520 the digital car key to the cellular telephone of a younger son with restricted drive-entitlements or privileges (ADMIN_3), and the son may share 522 the digital car key from his cellular telephone to his electronic watch.

The older son may attempt to share 524 the digital car key with full-drive entitlements or privileges to the younger son. This attempt may fail because the younger son already has a digital car key for this vehicle (which was shared by the owner). Similarly, the older son may attempt to share 526 the digital car key to the owner. This may also fail because the owner already has the digital car key for this vehicle Moreover, the owner may share 528 the digital car key with guest entitlements or privileges (GUEST_1) to a cellular telephone of a friend (which may have a shareability state of 'direct'). The friend may be allowed to share 530 the digital car key with guest entitlements or privileges to their electronic watch and other electronic devices on a same account of the friend. Otherwise, only digital car keys utility entitlements or privileges may be shared by guests.

Furthermore, the spouse may share 532 the digital car key with full access and drive entitlements or privileges (GUEST_2) to a guest (which may have a shareability state of 'direct'), and the guest may share 534 the digital car key with other electronic devices on a same account of the guest.

Additionally, the older son may share 536 the digital car key with restricted access and drive entitlements or privileges (GUEST_3) to a second guest (which may have a shareability state of 'direct'), and the second guest may share 538 the digital car key with other electronic devices on a same account of the second guest. In addition, the older son may share 540 the digital car key with restricted access and drive entitlements or privileges (GUEST_4) to a third guest (which may have a shareability state of 'direct'), and the third guest may share 542 the digital car key with other electronic devices on a same account of the third guest. However, an attempt by the second guest to share 544 the digital car key with restricted access and drive entitlements or privileges to the third guest may fail because guests may only be allowed to share digital car keys with utility entitlements or privileges. Thus, if the electronic device of the third guest is not on the same account as the second guest, sharing 544 may fail.

The first guest may share 546 the digital car key with full-drive entitlements or privileges (UTILITY_1) to a towing service when the vehicle breaks down on a highway. This instance of the digital car key may have a shareability state of 'none,' so the towing service cannot share the digital car key.

Moreover, the younger son may share 548 from his electronic watch the digital car key with valet entitlements or privileges to a valet (UTILITY_2). This instance of the digital car key may also have a shareability state of 'none.'

In some embodiments of the communication techniques, sharing of instances of a digital car key in a chain may be focused on an account-oriented experience where all electronic devices on the same account may have the same digital car key and capabilities. However, the instances of the digital car keys may be shared from electronic device-to-electronic device.

An electronic or digital wallet application on an electronic device may allow digital car keys having administrator entitlements or privileges to be shared. Such as 'administrator' digital car key may share: administrator, guest and/or utility digital car keys. Moreover, 'guest' digital car keys may only share 'utility' digital car keys before the sharing chain ends. Note that an associated computer system (e.g., in computer system 120 or 122 in FIG. 1) may provide information indicating the supported entitlements in a digital car key tracking response to all instances of the digital car key that can share (administrator and guest). If a sharing chain is too long, the computer system may restrict the sharing capability choice in the entitlements in order to end the chain.

When a digital car key is shared, the computer system may send this information to other instances of the digital car key on accounts that are upstream of the instances of the shared digital car key. The wallet application may take care of sharing a newly received instance of a digital car key to electronic devices that are associated with or on a same account. Note that 'delegate' digital car keys may be shared for delivery or driving purposes by the owner and/or 'administrator' digital car keys. However, it may not be possible to share two instances of digital car keys for the same vehicle to the same electronic device or account (e.g., so-called 'diamond sharing').

In some embodiments, a remote termination request for an instance of a digital car key may be signed by any other instance of the digital car key associated with or on an account upstream of the instance of the digital car key to be deleted. When an instance of a digital car key is remote terminated, a sharing sub-graph in an account may also be deleted. Thus, when an instance of the digital car key is deleted from an electronic device, the instances of the digital car key may be deleted from related electronic devices associated with the account (such as the electronic devices associated with an individual). Note that computer system 122 (FIG. 1) may manage the sharing graph and may send remote termination requests to instances of the digital car key on the sub-graph that need to be terminated.

Moreover, instances of digital car keys may be automatically migrated to a new electronic device during a buddy process, in which an old electronic device shares an instance of digital car key to the new electronic device. Thus, a new car-key-pairing operation may not need to be performed. Furthermore, if a vehicle is updated to support the sharing in a chain feature, then existing instances of the digital car key of an owner and/or a friend may be automatically migrated to the new system. Re-pairing or sharing by a user may not be needed. Additionally, an upstream electronic device may be able update entitlements and shareability of existing instances of a digital car key of administrator and/or a guest. In general, downgrading entitlements and shareability may not be recommended and may require additional effort by computer system 122 (FIG. 1). In some embodiments, the additional effort may include: proof of delivery, establishing liveness and/or another feature or operation. Note that an instance of a digital car key that is provided offline may include an electronic-device type and a hash of the account of the electronic device, so that vehicles may be able to group instances of digital car keys based at least in part on their associated account(s).

As summarized in Table 1, instances of digital car key(s) associated with an owner, an administrator, a guest/renter, utility, a delegate (drive) and a delegate (delivery) may have different rights and privileges (such as shareability, manageability, visibility and/or entitlements/access rights). Note that the owner may be able to share with the administrator, the guest/renter, the utility, the delegate (drive) and/or the delegate (delivery); the administrator may be able to share with another administrator, the guest/renter, the utility, the delegate (drive) and/or the delegate (delivery); the guest/renter may be able to share with the utility and/or electronic devices associated with an account of the guest/renter; however, the utility may not be allowed to share; the delegate (drive) may be allowed to share with a renter; and the delegate (delivery) may be allowed to share with another delegate (delivery) and/or the utility.

TABLE 1

| Role | Shareability | Manageability | Visibility | Entitlements/Access Rights |
| --- | --- | --- | --- | --- |
| Owner | Propagate | All | All | Full |
| Administrator | Propagate | Propagate | Propagate | Full, Restricted, Access Only |
| Guest/Renter | Direct | Propagate | Propagate | Full, Restricted, Access Only - But Not Lower Than Sharer |
| Utility | None | None | None | Valet, Car Delivery, Service (Full), Service (Valet) |

TABLE 1-continued

| Role | Shareability | Manageability | Visibility | Entitlements/Access Rights |
| --- | --- | --- | --- | --- |
| Delegate (Drive) | Propagate | Propagate | Propagate | Delegate (Drive) |
| Delegate (Delivery) | Propagate (Multi-Level Delivery) | Propagate | Propagate | Delegate (Delivery) |

In some embodiments, entitlements or privileges for an instance of a shared digital car key may be of equal or higher order than the entitlements or privileges of the sharer digital car key in order to avoid increasing the access rights through sharing. Notably, an owner, an administrator or a guest may have: full access and full-drive capabilities (or all driving features or capabilities of a vehicle); full access and restricted-drive capabilities (or some restrictions on driving features or capabilities of the vehicle); or full access and no drive (or no driving features or capabilities of the vehicle). Moreover, entitlements or privileges for utility digital car keys may include: restricted access for car delivery; access and drive for a valet; restricted vehicle service for vehicle service; or full access and drive for vehicle service. Furthermore, entitlements or privileges for delegate digital car keys may include: delegated sharing (drive), which may not be valid on a vehicle, but which may allow the sharing of full-function instances of digital car keys; and delegated sharing (delivery), which may not be valid on a vehicle and which may only share delivery of instance of digital car keys.

Referring to FIG. 1, note that sharing of an instance of a digital car key in the communication techniques may be implemented in a variety of way. Moreover, in embodiments of the communication techniques, note that an 'invitation' may include providing a pointer to an address or location (such as a uniform resource locator or URL) of a computer system (such as computer system 120, which may function as a relay server in this regard) and/or for a car-key creation request from electronic device 110. In some embodiments, the invitation and the car-key creation request may be sent separately. For example, the invitation may be communicated over a communication channel, and may include a URL for the computer system (such as the relay server) that communicates data used for sharing an instance of a digital car key. Then, the car-key creation request may be sent from electronic device 110 to, e.g., electronic device 114 via the computer system. Alternatively, the invitation and car-key creation request may be bundled or communicated together. In these embodiments, the invitation may include an address of electronic device 110 to allow electronic device 114 to communicate with electronic device 110 to complete the car-key-sharing process. For example, the invitation and car-key creation request may be communicated using a side message system (SMS) or text messaging service, in which case the relay server may be an Internet database access server.

Furthermore, sharing an instance of the digital car key may involve at least some of the following operations. Electronic device 114 of a recipient (such as a friend) may establish a communication channel with electronic device 110 of a provider (such as vehicle owner) based at least in part on an address or handle in the invitation. Then, electronic device 114 may receive a car-key creation request from electronic device 110. The request may include the data used configure the instance of the digital car key (such as the public encryption key of the vehicle, the vehicle identifier, sharing permissions, etc.). The request may also include: access rights and a validity period, a name the provider has chosen for the instance of the digital car key that is being shared, etc.

Additionally, electronic device 114 may create the instance of the digital car key based at least in part on the creation data (such as using an elliptic-curve cryptography encryption key pair or an asymmetric encryption key pair) using a secure element in electronic device 114. This secure element may create a key certificate (which is sometimes referred to as an 'endpoint certificate') that includes the public key and may confirm the car-key creation data provided by electronic device 110.

Next, electronic device 114 may send a car-key signing request to electronic device 110. This car-key signing request may include the endpoint certificate and a chain of certificates (such as an instance of a certificate authority on the secure element of electronic device 114 and an external certificate authority) that proves to the provider that the instance of the digital car key has been created in a genuine (and approved) electronic device associated with a provider or a manufacturer of electronic device 114.

Electronic device 110 may validate the signatures of the certificate chain (notably, the public key of a 'higher' certificate may be used to verify the signature of a 'lower certificate' in the certificate chain) until the highest certificate (the external certificate authority certificate) is validated using an 'authorized public key' that vehicle 112 provided to electronic device 110 during previous car-key pairing. Note that the authorized public key may be a root public key of a manufacturer or provider of vehicle 112. Moreover, note that, when the certificate chain is valid, then the instance of the digital car key may be valid.

Furthermore, electronic device 110) may validate that the data included in the endpoint certificate may be the same data that was requested in the car-key creation request.

Additionally, when the preceding operations are successful, the provider may digitally sign the public key of the recipient with their own private key and send an import request to electronic device 114. Note that the import request may include a car-key attestation, which may include the digital signature of the provider over the public key of vehicle 112 and the associated access rights (such as the ability to unlock vehicle 112, the ability to start the engine of vehicle 112, etc.).

Subsequently, when the recipient approaches vehicle 112 with electronic device 114 for the first time, vehicle 112 may perform a cryptographic transaction. During the cryptographic transaction, electronic device 114 may provide the car-key attestation to vehicle 112. In response, vehicle 112 may check the car-key attestation. Notably, vehicle 112 may check the digital signature of the provider (e.g., vehicle 112 may store the public key of the provider). Then, vehicle 112 may store the public key and access rights of the recipient.

In some embodiments, electronic device 114 may send the certificate chain and access rights to computer system 122. In response, computer system 122 may: check the certificates, store information associated with instances of the digital car key for insurance purposes (such as a number of issued instances of the digital car key), and/or may append its digital signature to the car-key attestation. Then, vehicle 112 may verify the digital signatures of the provider and the manufacturer or the provider of vehicle 112 before accepting the instance of the digital car key on electronic device 114.

Note that the formats of packets or frames communicated during the communication techniques may include more or fewer bits or fields. Alternatively or additionally, the position of information in these packets or frames may be changed. Thus, the order of the fields may be changed.

While the preceding embodiments illustrate embodiments of the communication techniques using channels or frequency sub-bands, in other embodiments the communication techniques may involve the concurrent use of different temporal slots, and/or or a combination of different frequency sub-bands, different frequency bands and/or different temporal slots.

Moreover, while the preceding embodiments illustrated the use of Wi-Fi, a cellular-telephone communication protocol and/or Ethernet in the communication techniques, in other embodiments of the communication techniques another communication protocol (such as Bluetooth or Bluetooth Low Energy) is used to communicate at least a portion of the information in the communication techniques. Furthermore, the information communicated in the communication techniques may be communicated may occur in one or more frequency bands, including: 900 MHz, a 2.4 GHz frequency band, a 5 GHz frequency band, a 6 GHz frequency band, a 7 GHz frequency band, a 60 GHz frequency band, a Citizens Broadband Radio Service (CBRS) frequency band, a band of frequencies used by LTE, etc.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 6 presents a block diagram of an electronic device 600 (which may be a cellular telephone, a smartwatch, an access point, an IoT device, another electronic device, etc.) in accordance with some embodiments. This electronic device includes processing subsystem 610, memory subsystem 612 and networking subsystem 614. Processing subsystem 610 includes one or more devices configured to perform computational operations. For example, processing subsystem 610 can include one or more microprocessors, application-specific integrated circuits (ASICs), microcontrollers, graphics processing units (GPUs), programmable-logic devices, and/or one or more digital signal processors (DSPs).

Memory subsystem 612 includes one or more devices for storing data and/or instructions for processing subsystem 610, and/or networking subsystem 614. For example, memory subsystem 612 can include dynamic random access memory (DRAM), static random access memory (SRAM), a read-only memory (ROM), flash memory, and/or other types of memory. In some embodiments, instructions for processing subsystem 610 in memory subsystem 612 include: program instructions or sets of instructions (such as program instructions 622 or operating system 624), which may be executed by processing subsystem 610. For example, a ROM can store programs, utilities or processes to be executed in a non-volatile manner, and DRAM can provide volatile data storage, and may store instructions related to the operation of electronic device 600. Note that the one or more computer programs may constitute a computer-program mechanism, a computer-readable storage medium or software. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610. In some embodiments, the one or more computer programs are distributed over a network-coupled computer system so that the one or more computer programs are stored and executed in a distributed manner.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), such as: control logic 616, one or more interface circuits 618 and a set of antennas 620 (or antenna elements) in an adaptive array that can be selectively turned on and/or off by control logic 616 to create a variety of optional antenna patterns or 'beam patterns.' Alternatively, instead of the set of antennas, in some embodiments electronic device 600 includes one or more nodes 608, e.g., a pad or a connector, which can be coupled to the set of antennas 620. Thus, electronic device 600 may or may not include the set of antennas 620. For example, networking subsystem 614 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fix networking system), an Ethernet networking system, and/or another networking system.

In some embodiments, networking subsystem 614 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or frame frames and/or scanning for advertising frames transmitted by other electronic devices.

Within electronic device 600, processing subsystem 610, memory subsystem 612 and networking subsystem 614 are coupled together using bus 628 that facilitates data transfer between these components. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc. Display subsystem 626 may be controlled by processing subsystem 610 to display information to a user (e.g., information relating to incoming, outgoing, or an active communication session).

Electronic device 600 can also include a user-input subsystem 630 that allows a user of the electronic device 600 to interact with electronic device 600. For example, user-input subsystem 630 can take a variety of forms, such as: a button, keypad, dial, touch screen, audio input interface, visual/image capture input interface, input in the form of sensor data, etc.

Electronic device 600 can be (or can be included in) any electronic device with at least one network interface. For example, electronic device 600 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. In some embodiments, electronic device may include an analysis subsystem that performs at least some of the operations in the communication techniques. Also, although separate subsystems are shown in FIG. 6, in some embodiments some or all of a given subsystem or component can be integrated into one or more of the other subsystems or component(s) in electronic device 600. For example, in some embodiments program instructions 622 are included in operating system 624 and/or control logic 616 is included in the one or more interface circuits 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614. This integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Bluetooth or a Bluetooth Low Energy communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 622, operating system 624 (such as a driver for an interface circuit in networking subsystem 614) or in firmware in an interface circuit networking subsystem 614. Alternatively or additionally, at least some of the operations in the communication techniques may be implemented in a physical layer, such as hardware in an interface circuit in networking subsystem 614. In some embodiments, the communication techniques are implemented, at least in part, in a MAC layer and/or in a physical layer in an interface circuit in networking subsystem 614.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:
1. An electronic device, comprising:
an antenna node configured to communicatively couple to an antenna; and
an interface circuit, communicatively coupled to the antenna node, configured to communicate with a second electronic device and a computer;

a processor coupled to the interface circuit; and
memory, coupled to the processor, storing program instructions, wherein, when executed by the processor, the program instructions cause the electronic device to perform operations comprising:
providing, addressed to the second electronic device, an invitation to share a digital car key associated with a user of the electronic device and a vehicle, wherein the invitation comprises information for creating another instance of the digital car key on the second electronic device;
receiving, associated with the second electronic device, a message accepting the invitation, wherein the message comprises a certificate associated with the other instance of the digital car key on the second electronic device;
providing, addressed to the second electronic device, an approved version of the certificate with a digital signature of the user; and
providing, addressed to the computer, an instruction to share the digital car key with a set of electronic devices, wherein the set of electronic devices is associated with an account of a second user of the second electronic device.

2. The electronic device of claim 1, wherein electronic devices in the set of electronic devices are associated with multiple individuals.

3. The electronic device of claim 1, wherein the operations comprise:
receiving, associated with a given electronic device in the set of electronic devices, a given message with a given certificate associated with an additional instance of the digital car key on the given electronic device; and
providing, addressed to the given electronic device, an approved version of the given certificate with the digital signature of the user.

4. The electronic device of claim 1, wherein the instruction to share the digital car key comprise second information for creating additional instances of the digital car key on the set of electronic devices.

5. The electronic device of claim 1, wherein the other instance of the digital car key or a given additional instance of the digital car key installed on a given electronic device in the set of electronic devices has different privileges or rights than the digital car key.

6. The electronic device of claim 1, wherein privileges or rights associated with the other instance of the digital car key or a given additional instance of the digital car key installed on a given electronic device in the set of electronic devices comprise being allowed to share the digital car key with another electronic device.

7. The electronic device of claim 1, wherein privileges or rights associated with the other instance of the digital car key or a given additional instance of the digital car key installed on a given electronic device in the set of electronic devices comprise: an ability to control a subset of features associated with the vehicle; one or more circumstances when the other digital car key or the given additional instance of the digital car key is valid; or an operating constraint on at least a feature associated with the vehicle.

8. The electronic device of claim 1, wherein the user comprises an owner of the vehicle.

9. The electronic device of claim 1, wherein the operations comprise providing, addressed to a second computer associated with a manufacturer or provider of the vehicle, a report specifying a number of instances of the digital car key that have been created.

10. The electronic device of claim 1, wherein the instructions are based at least in part on a predefined maximum number of instances of the digital car key.

11. The electronic device of claim 1, wherein the information or the instructions comprise: an identifier of the vehicle, an encryption key associated with the user, and privileges or rights associated with the other instance of the digital car key or a given additional instance of the digital car key installed on a given electronic device in the set of electronic devices.

12. A non-transitory computer-readable storage medium for use in conjunction with an electronic device, the computer-readable storage medium storing program instructions, wherein, when executed by the electronic device, cause the electronic device to perform operations comprising:
providing, addressed to a second electronic device, an invitation to share a digital car key associated with a user of the electronic device and a vehicle, wherein the invitation comprises information for creating another instance of the digital car key on the second electronic device;
receiving, associated with the second electronic device, a message accepting the invitation, wherein the message comprises a certificate associated with the other instance of the digital car key on the second electronic device;
providing, addressed to the second electronic device, an approved version of the certificate with a digital signature of the user; and
providing, addressed to the computer, an instruction to share the digital car key with a set of electronic devices, wherein the set of electronic devices is associated with an account of a second user of the second electronic device.

13. The non-transitory computer-readable storage medium of claim 12, wherein the operations comprise:
receiving, associated with a given electronic device in the set of electronic devices, a given message with a given certificate associated with an additional instance of the digital car key on the given electronic device; and
providing, addressed to the given electronic device, an approved version of the given certificate with the digital signature of the user.

14. The non-transitory computer-readable storage medium of claim 12, wherein the other instance of the digital car key or a given additional instance of the digital car key installed on a given electronic device in the set of electronic devices has different privileges or rights than the digital car key.

15. The non-transitory computer-readable storage medium of claim 12, wherein privileges or rights associated with the other instance of the digital car key or a given additional instance of the digital car key installed on a given electronic device in the set of electronic devices comprise being allowed to share the digital car key with another electronic device.

16. A method for sharing a digital car key with a set of electronic devices, comprising:
by an electronic device:
providing, addressed to a second electronic device, an invitation to share the digital car key associated with a user of the electronic device and a vehicle, wherein the invitation comprises information for creating another instance of the digital car key on the second electronic device;
receiving, associated with the second electronic device, a message accepting the invitation, wherein the message comprises a certificate associated with the other instance of the digital car key on the second electronic device;

providing, addressed to the second electronic device, an approved version of the certificate with a digital signature of the user; and providing, addressed to the computer, an instruction to share the digital car key with the set of electronic devices, wherein the set of electronic devices is associated with an account of a second user of the second electronic device.

17. The method of claim 16, wherein the method comprises:

receiving, associated with a given electronic device in the set of electronic devices, a given message with a given certificate associated with an additional instance of the digital car key on the given electronic device; and providing, addressed to the given electronic device, an approved version of the given certificate with the digital signature of the user.

18. The method of claim 16, wherein the other instance of the digital car key or a given additional instance of the digital car key installed on a given electronic device in the set of electronic devices has different privileges or rights than the digital car key.

19. The method of claim 16, wherein privileges or rights associated with the other instance of the digital car key or a given additional instance of the digital car key installed on a given electronic device in the set of electronic devices comprise being allowed to share the digital car key with another electronic device.

20. The method of claim 16, wherein the operations comprise providing, addressed to a second computer associated with a manufacturer or provider of the vehicle, a report specifying a number of instances of the digital car key that have been created.

* * * * *

UNITED STATES PATENT AND TRADEMARK OFFICE
CERTIFICATE OF CORRECTION

| | | |
|---|---|---|
| PATENT NO. | : 11,891,015 B2 | |
| APPLICATION NO. | : 17/716817 | |
| DATED | : February 6, 2024 | |
| INVENTOR(S) | : Matthias Lerch et al. | |

It is certified that error appears in the above-identified patent and that said Letters Patent is hereby corrected as shown below:

In the Specification

Column 13, Line 8, delete "processor 420" and insert --processor 418--.
Column 13, Line 9, delete "processor 420" and insert --processor 418--.
Column 13, Line 15, delete "processor 420" and insert --processor 418--.
Column 13, Line 16, delete "processor 420" and insert --processor 418--.
Column 13, Line 18, delete "processor 420" and insert --processor 418--.
Column 13, Line 25, delete "processor 420" and insert --processor 418--.

In the Claims

Column 27, Line 7, Claim 9, delete "the computer" and insert --a computer--.

Signed and Sealed this
Twenty-third Day of April, 2024

Katherine Kelly Vidal
*Director of the United States Patent and Trademark Office*